(12) United States Patent
Troester et al.

(10) Patent No.: US 11,467,838 B2
(45) Date of Patent: Oct. 11, 2022

(54) FASTPATH MICROCODE SEQUENCER

(71) Applicant: Advanced Micro Devices, Inc., Santa Clara, CA (US)

(72) Inventors: Kai Troester, Pepperell, MA (US); Magiting Talisayon, West Newton, MA (US); Hongwen Gao, Fremont, CA (US); Benjamin Floering, San Jose, CA (US); Emil Talpes, San Mateo, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/986,626

(22) Filed: May 22, 2018

(65) Prior Publication Data
US 2019/0361699 A1    Nov. 28, 2019

(51) Int. Cl.
G06F 9/30     (2018.01)
(52) U.S. Cl.
CPC ........ G06F 9/3016 (2013.01); G06F 9/30032 (2013.01)
(58) Field of Classification Search
None
See application file for complete search history.

(56) References Cited

U.S. PATENT DOCUMENTS

| 4,021,779 A | 5/1977 | Gardner |
| 4,455,604 A | 6/1984 | Ahlstrom et al. |
| 4,498,132 A | 2/1985 | Ahlstrom et al. |
| 4,642,757 A | 2/1987 | Sakamoto |
| 4,901,235 A | 2/1990 | Vora et al. |

(Continued)

FOREIGN PATENT DOCUMENTS

| EP | 0098494 A2 | 1/1984 |
| EP | 0178671 A2 | 4/1986 |

OTHER PUBLICATIONS

International Search Report and Written Opinion in International Application No. PCT/US2008/08802, dated Oct. 6, 2008, 14 pages.

(Continued)

*Primary Examiner* — John M Lindlof
(74) *Attorney, Agent, or Firm* — Kowert Hood Munyon Rankin and Goetzel PC; Rory D. Rankin (57) ABSTRACT

Systems, apparatuses, and methods for implementing a fastpath microcode sequencer are disclosed. A processor includes at least an instruction decode unit and first and second microcode units. For each received instruction, the instruction decode unit forwards the instruction to the first microcode unit if the instruction satisfies at least a first condition. In one implementation, the first condition is the instruction being classified as a frequently executed instruction. If a received instruction satisfies at least a second condition, the instruction decode unit forwards the received instruction to a second microcode unit. In one implementation, the first microcode unit is a smaller, faster structure than the second microcode unit. In one implementation, the second condition is the instruction being classified as an infrequently executed instruction. In other implementations, the instruction decode unit forwards the instruction to another microcode unit responsive to determining the instruction satisfies one or more other conditions.

20 Claims, 8 Drawing Sheets

(56) References Cited

U.S. PATENT DOCUMENTS

| | | | |
|---|---|---|---|
| 5,036,453 | A | 7/1991 | Renner et al. |
| 5,574,927 | A | 11/1996 | Scantlin |
| 5,630,082 | A * | 5/1997 | Yao .................... G06F 9/30149 |
| | | | 712/213 |
| 5,649,112 | A | 7/1997 | Yeager et al. |
| 5,671,356 | A | 9/1997 | Wang |
| 5,796,972 | A | 8/1998 | Johnson et al. |
| 5,845,102 | A | 12/1998 | Miller et al. |
| 6,141,740 | A | 10/2000 | Mahalingaiah et al. |
| 7,095,342 | B1 | 8/2006 | Hum et al. |
| 7,743,232 | B2 | 6/2010 | Shen et al. |
| 2007/0083735 | A1 | 4/2007 | Glew |
| 2012/0260066 | A1* | 10/2012 | Henry ................ G06F 9/30174 |
| | | | 712/41 |
| 2018/0095753 | A1* | 4/2018 | Bai .................... G06F 9/30058 |

OTHER PUBLICATIONS

Rice et al. "A Formal Model for SIMD Computation", Proceedings., 2nd Symposium on the Frontiers of Massively Parallel Computation, Oct. 1988, pp. 601-607.

* cited by examiner

FASTPATH MICROCODE SEQUENCER

BACKGROUND

Description of the Related Art

Processors typically rely on microcode sequencers to decode complex instructions into a series of simplified operations (or "ops"). As used herein, the term "microcode" is defined as a plurality of ops. It is noted that ops can also be referred to as micro-ops (or μops). Ops are typically fetched from a microcode storage unit, which is implemented in some processors as a large read-only memory (ROM) or random-access memory (RAM). In some processors, an instruction decode unit generates an initial address from a fetched instruction, and the initial address serves as an entry point into the microcode storage unit. Ops can be followed by an address of the next op or an indication that the last op has been reached if the op is the end of the microcode sequence for the fetched instruction.

To implement instructions requiring more than just a few ops, processors use sequences of ops that are read from the microcode storage unit. This access is relatively slow and introduces stall cycles into the processor pipeline. Accordingly, techniques to reduce the performance impact of slow microcode sequence access times are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a fastpath microcode sequencer are disclosed herein. A system includes one or more processors coupled to one or more memories. Each processor includes a processor pipeline with a plurality of pipeline stages for fetching, processing, and executing instructions. Instructions are fetched and then conveyed to an instruction decode unit. For each received instruction, the instruction decode unit forwards the instruction to a first microcode unit responsive to determining the instruction satisfies at least a first condition. In one implementation, the first condition is the instruction being classified as a frequently executed instruction. If a received instruction satisfies at least a second condition, the instruction decode unit forwards the received instruction to a second microcode unit. In one implementation, the second condition is the instruction being classified as an infrequently executed instruction. In one implementation, the first microcode unit is a smaller, faster structure than the second microcode unit. In other implementations, the instruction decode unit forwards the instruction to another microcode unit responsive to determining the instruction satisfies one or more other conditions.

In another implementation, the instruction decode unit forwards a received instruction to the first microcode unit responsive to determining the instruction satisfies at least the first condition and a third condition. In one implementation, the third condition is the instruction mapping to a number of ops which is less than a threshold. Also, in another implementation, the instruction decode unit forwards a received instruction to the second microcode unit responsive to determining the instruction satisfies at least the second condition and a fourth condition. In one implementation, the fourth condition is the instruction mapping to a number of ops which is greater than or equal to the threshold.

Figure 1:
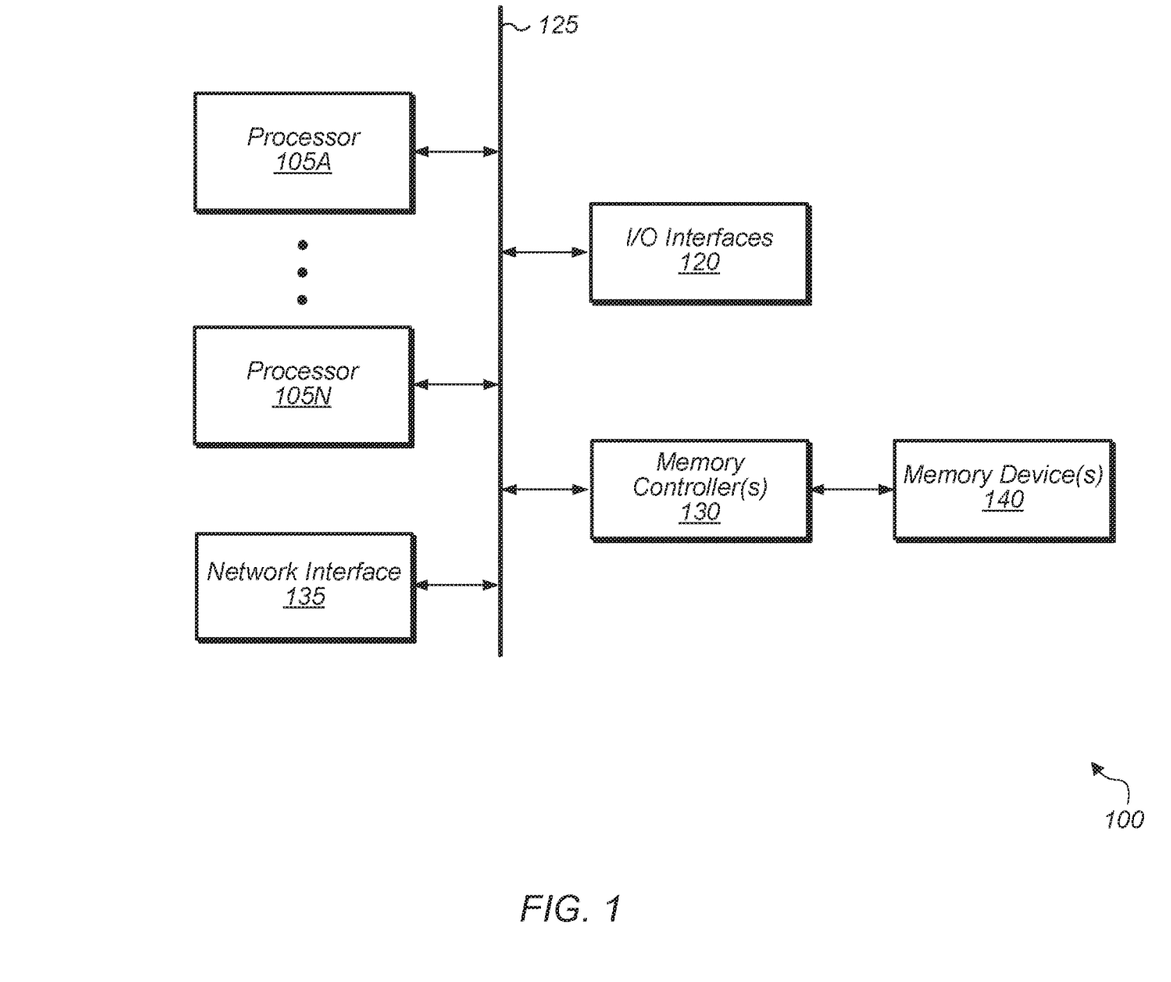
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
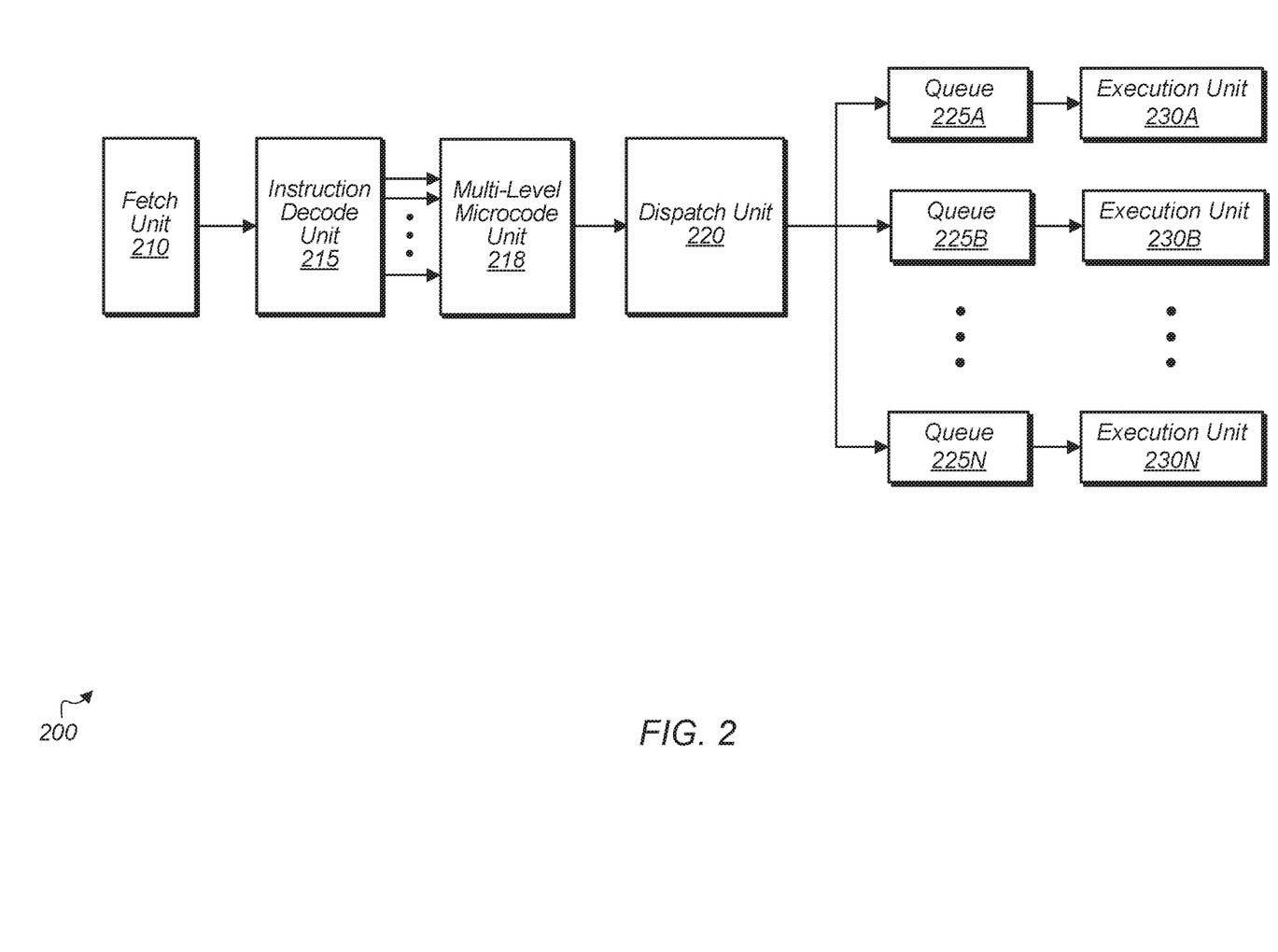
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, decode unit 215, dispatch unit 220, queues 225A-N, and execution units 230A-N. It should be understood that processor pipeline 200 also includes other components (e.g., branch prediction unit, instruction cache) which are not shown to avoid obscuring the figure. In other implementations, processor pipeline 200 is structured in other suitable manners.

In one implementation, fetch unit 210 fetches instructions of a program stream from memory and/or an instruction cache, and fetch unit 210 conveys the fetched instructions to instruction decode unit 215. Instruction decode unit 215 conveys fetched instructions to one of multiple microcode units where stored microcode sequences are retrieved for the fetched instructions. Each stored microcode sequence includes a plurality of instruction operations (or ops for short). It is noted that ops are also referred to as micro-ops or μops. Generally, an instruction operation is an operation that the hardware included in execution units 230A-N is capable of executing. In various implementations, each instruction translates to one or more ops which, when executed, result in the performance of the operations defined for that instruction according to the instruction set architecture. Any type of instruction set architecture is employed by processor pipeline 200.

In various implementations, multi-level microcode unit 218 includes multiple separate microcode units. In one implementation, multi-level microcode unit 218 includes two separate microcode units. In this implementation, multi-level microcode unit 218 includes a fast, small microcode unit which stores microcode sequences for frequently executed instructions. Additionally, in this implementation, multi-level microcode unit 218 includes a slow, large microcode unit (as compared to the fast, small microcode unit) which stores microcode sequences for infrequently executed instructions. In another implementation, multi-level microcode unit 218 includes three separate microcode units. In other implementations, multi-level microcode unit 218 includes other numbers of microcode units.

The ops from instruction decode unit 215 are provided to dispatch unit 220, and dispatch unit assigns the ops to queues 225A-N. As shown in processor pipeline 200, each queue 225A-N is coupled to a corresponding execution unit 230A-N. However, in other implementations, one or more queues 225A-N are coupled to multiple execution units 230A-N. When the dependencies are resolved and the ops are ready to execute, pickers (not shown) will pick the ops out of queues 225A-N to execute on the execution units 230A-N.

Figure 3:
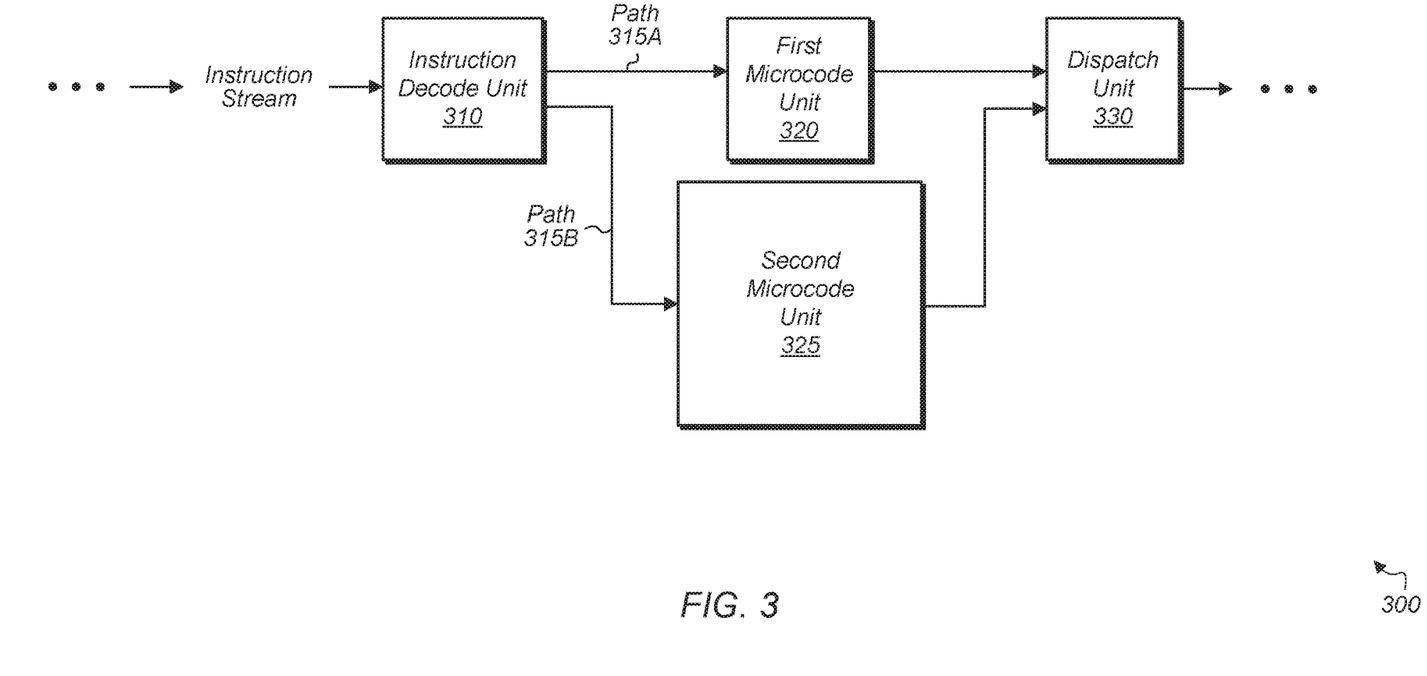
FIG. 3 is a block diagram of one implementation of a portion of a processor pipeline.

Referring now to FIG. 3, a block diagram of one implementation of a portion of a processor pipeline 300 is shown. In one implementation, the portion of processor pipeline 300 is included within processor pipeline 200. A fetch unit (not shown) fetches instructions from a cache and/or memory, and then the fetched operations are provided to instruction decode unit 310. For each instruction, instruction decode unit 310 decides whether to forward the instruction on path 315A or path 315B depending on whether one or more conditions are met as discussed in greater detail below. Path 315A connects to first microcode unit 320 while path 315B connects to second microcode unit 325. In one implementation, first microcode unit 320 is a smaller structure than second microcode unit 325. Additionally, in one implementation, accesses to microcode in first microcode unit 320 are performed with less latency than accesses to microcode in second microcode unit 325. The lower latency is achieved due to a shorter path 315A as compared to path 315B and/or due to faster logic for accessing the stored microcode sequences.

If instruction decode unit 310 conveys an instruction on path 315A, the microcode sequence for this instruction is retrieved from a memory structure within first microcode unit 320 and conveyed to dispatch unit 330. The microcode sequence includes one or more ops which are executable by one or more execution units to perform the operation(s) defined for that instruction. If instruction decode unit 310 conveys an instruction on path 315B, the microcode sequence for this instruction is retrieved from a memory structure within second microcode unit 325 and conveyed to dispatch unit 330. The ops of the microcode sequence are then dispatched by dispatch unit 330 to subsequent stages (not shown) of processor pipeline 300.

Figure 4:
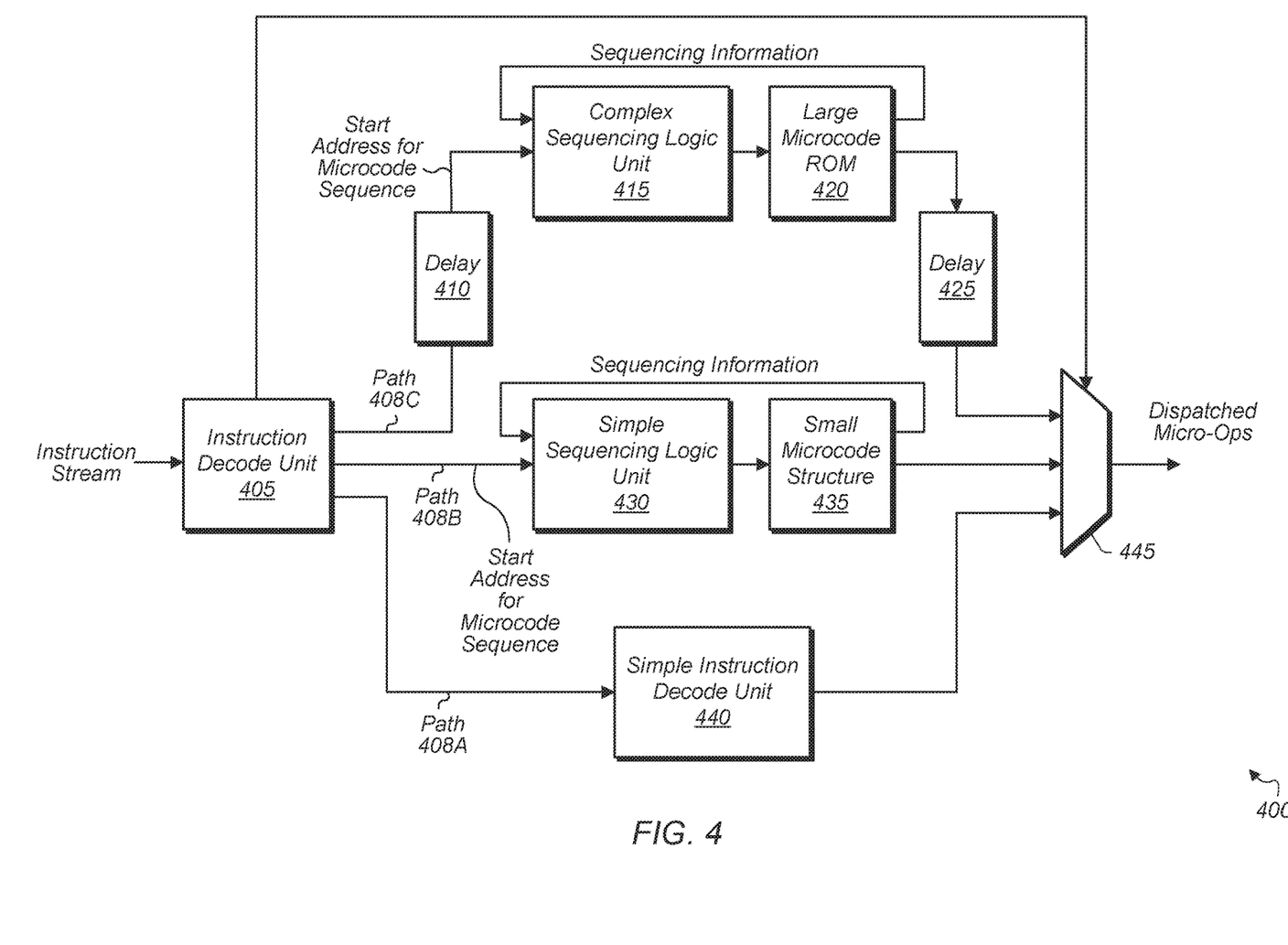
FIG. 4 is a block diagram of one implementation of a multi-path microcode sequencer.

Turning now to FIG. 4, a block diagram of one implementation of a multi-path microcode sequencer is shown. Sequencer 400 includes instruction decode unit 405 which receives instructions from an instruction stream. For each received instruction, instruction decode unit 405 determines on which path to send the instruction depending on which microcode sequencing unit should be used to generate microcode for the instruction. In one implementation, there are three paths for generating microcode for instructions of the instruction stream. In other implementations, there are other numbers of paths, such as four, five, six, and so on, for generating microcode for instructions of the instruction stream.

When instruction decode unit 405 determines that an instruction is able to be decoded by simple instruction decode unit 440, then instruction decode unit 405 conveys the instruction on path 408A to simple instruction decode unit 440. Simple instruction decode unit 440 then decodes the instruction and generates microcode which is conveyed to a first input of multiplexer (or mux) 445.

For frequently encountered instructions that do not map to simple microcode sequences, the microcode for these frequently encountered instructions is stored in small microcode structure 435. In one implementation, small microcode structure 435 is implemented as a table. In another implementation, small microcode structure 435 is implemented using read-only memory (ROM). In other implementations, small microcode structure 435 is implemented using other types of memory structures. When instruction decode unit 405 determines that the instruction maps to microcode stored in small microcode structure 435, instruction decode unit 405 generates the start address for the microcode sequence and conveys the start address on path 408B to simple sequencing logic unit 430. Simple sequencing logic unit 430 accesses small microcode structure 435 to retrieve the microcode corresponding to the instruction. Small microcode structure 435 also stores sequencing information which is fed back to simple sequencing logic unit 430 and used to generate subsequent addresses into small microcode structure 435. When the entirety of the microcode sequence is retrieved, small microcode structure 435 conveys the microcode to a second input of mux 445.

When instruction decode unit 405 determines that an instruction is a complex instruction and/or is an infrequently encountered instruction, instruction decode unit 405 generates and conveys the start address for the microcode sequence of the instruction on path 408C to complex sequencing logic unit 415. In one implementation, there is a delay 410 associated with sending the instruction on path 408C to complex sequencing logic unit. Complex sequencing logic unit 415 conveys the start address for the microcode sequence to large microcode ROM 420. It should be understood that in other implementations, large microcode ROM 420 is implemented using other types of structures. Large microcode ROM 420 feeds back sequencing information to complex sequencing logic unit 415. The microcode sequence is conveyed from large microcode ROM 420 to a third input of mux 445. In one implementation, there is a delay 425 associated with conveying the microcode sequence on the path from large microcode ROM 420 to mux 445. Depending on which path 408A-C the instruction traversed, mux 445 will pass the microcode sequence from the appropriate input through to the output of mux 445. The output of mux 445 is coupled to subsequent pipeline stages (not shown).

Figure 5:
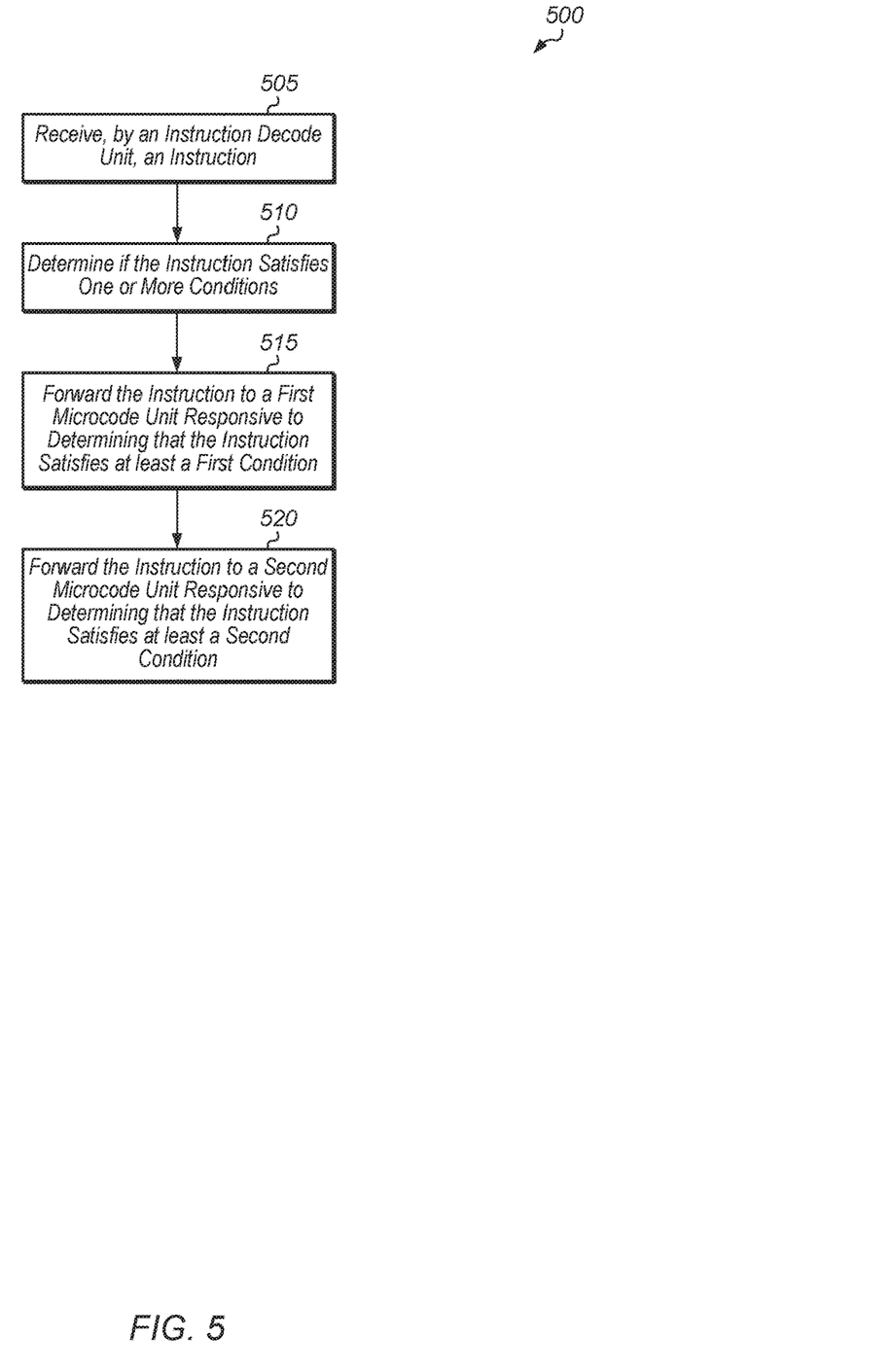
FIG. 5 is a generalized flow diagram illustrating one implementation of a method for implementing a fastpath microcode sequencer.
Figure 6:
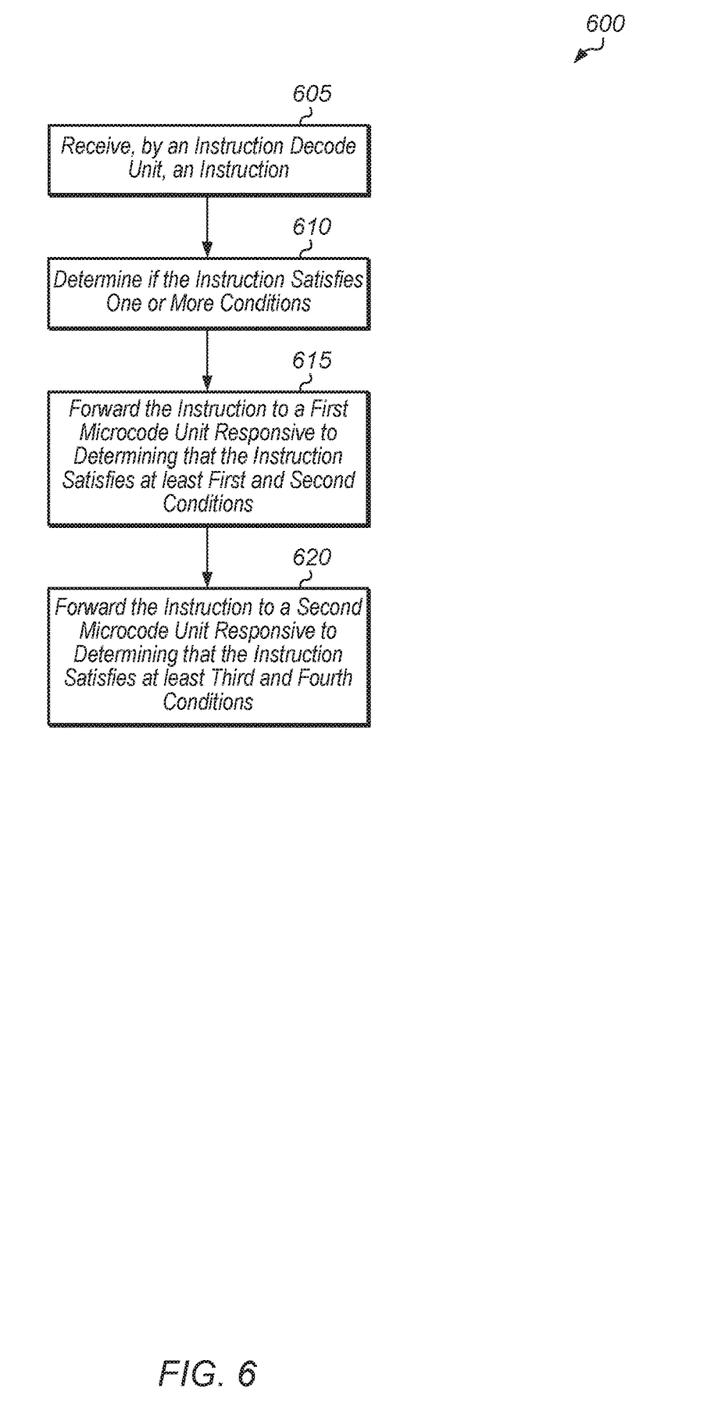
FIG. 6 is a generalized flow diagram illustrating another implementation of a method for implementing a fastpath microcode sequencer.
Figure 7:
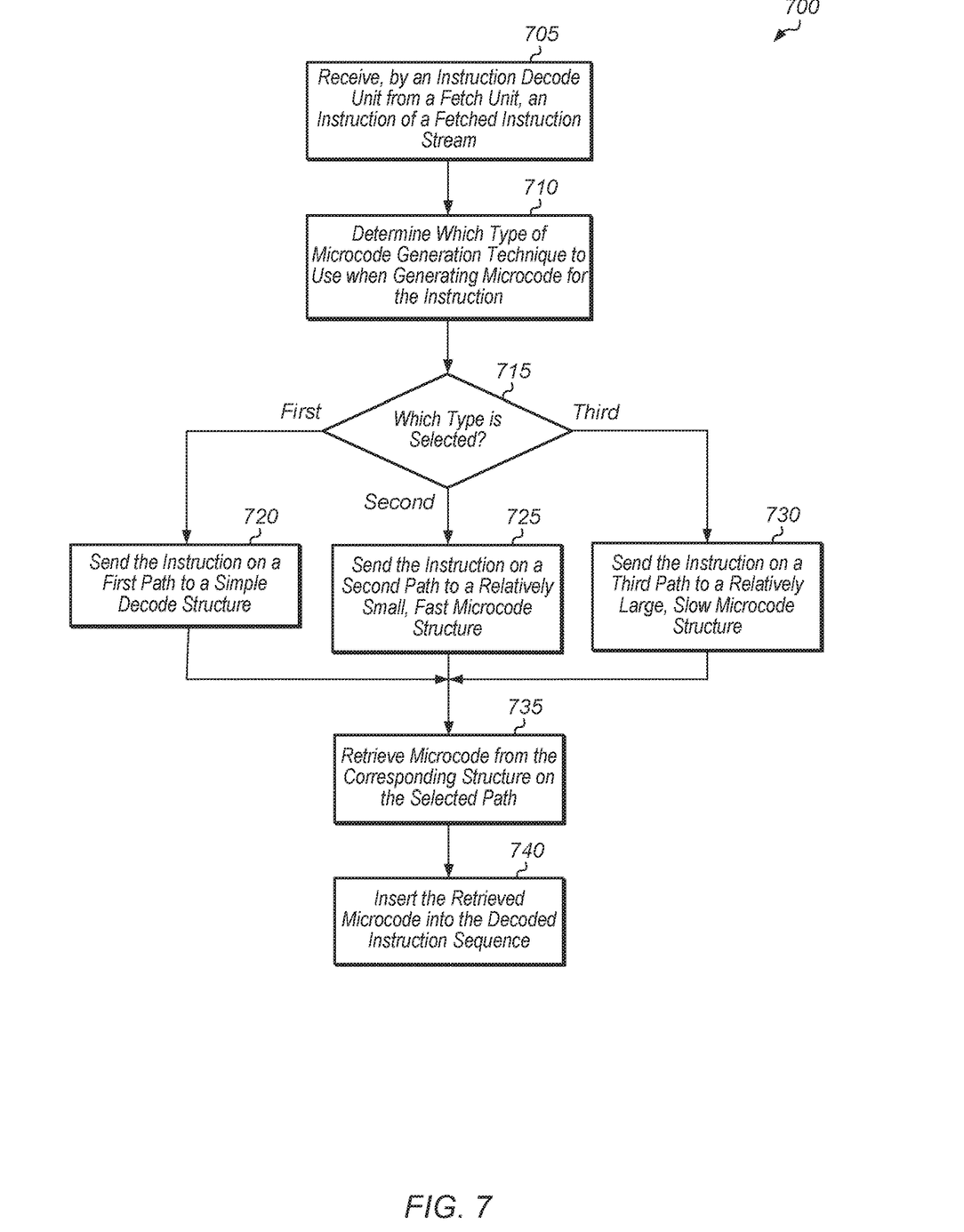
FIG. 7 is a generalized flow diagram illustrating one implementation of a method for implementing a multi-path microcode generation unit.
Figure 8:
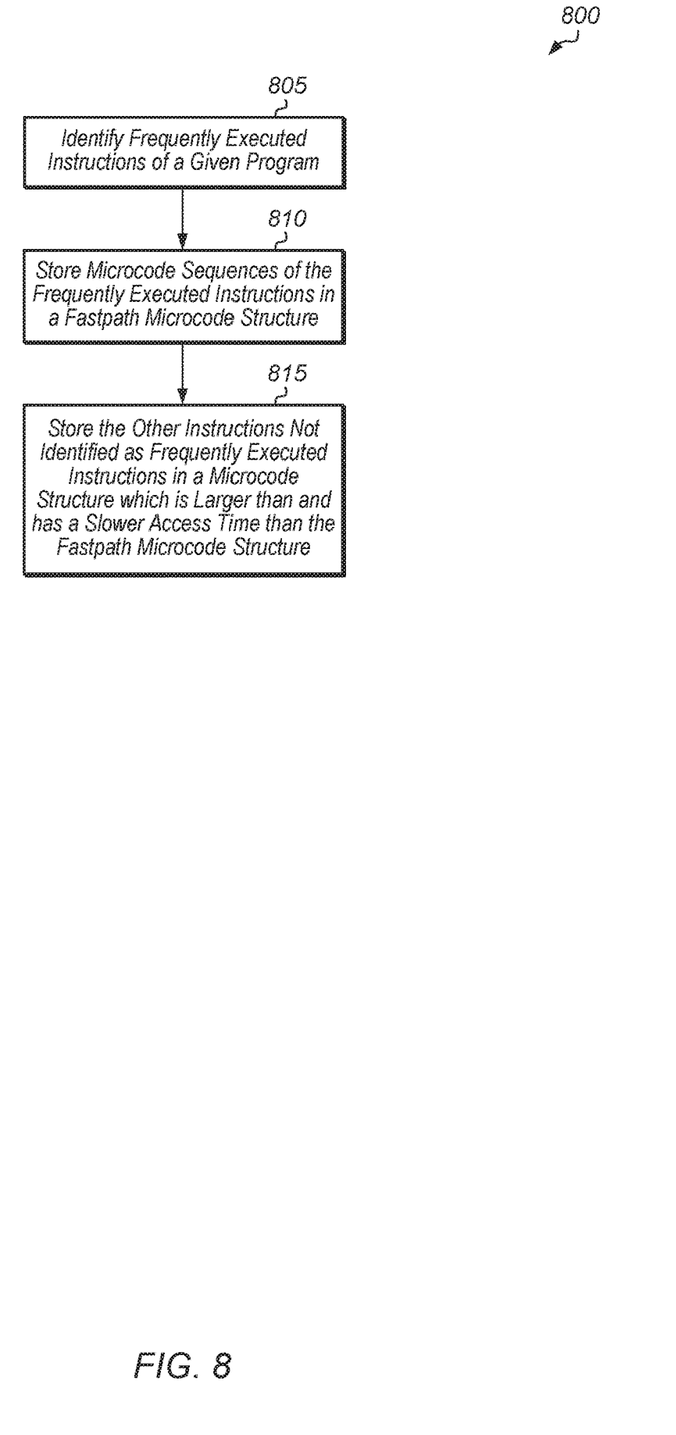
FIG. 8 is a generalized flow diagram illustrating one implementation of a method for implementing a determining which microcode sequences to store in a fastpath microcode structure.

Referring now to FIG. 5, one implementation of a method 500 for implementing a fastpath microcode sequencer is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

An instruction decode unit receives an instruction (block 505). In one implementation, the instruction decode unit receives the instruction from an instruction fetch unit. In some implementations, the instruction decode unit receives multiple instructions from the instruction fetch unit per clock cycle. Next, the instruction decode unit determines if the instruction satisfies one or more conditions (block 510).

Then, the instruction decode unit forwards the instruction to a first microcode unit responsive to determining that the instruction satisfies at least a first condition (block 515). In one implementation, the first condition is the instruction being classified as a frequently executed instruction. In one implementation, the instruction decode unit dynamically determines whether the instruction is classified as a frequently executed instruction while in another implementation, the classification of the instruction as a frequently executed instruction is predetermined. In one implementation, an instruction is classified as a frequently executed instruction if the instruction is executed more than a threshold number of times in a given period of time. In another implementation, the instruction decode unit forwards the instruction to a first microcode unit responsive to determining that the instruction satisfies at least the first condition and responsive to determining that the instruction maps to a number of ops which is less than a threshold.

Alternatively, the instruction decode unit forwards the instruction to a second microcode unit responsive to determining that the instruction satisfies at least a second condition (block 520). In one implementation, the second condition is the instruction being classified as an infrequently executed instruction. In one implementation, an instruction is classified as an infrequently executed instruction if the instruction is executed less than or equal to the threshold number of times in a given period of time. In one implementation, the first microcode unit is a smaller, faster structure than the second microcode unit. It is noted that in some implementations, instruction decode unit is coupled to other numbers of microcode units, and the instruction decode unit forwards the instruction to another microcode unit based on the instruction satisfying one or more other conditions. It is noted that in one implementation, method 500 is performed for each instruction received by the instruction decode unit.

Turning now to FIG. 6, another implementation of a method 600 for implementing a fastpath microcode sequencer is shown. An instruction decode unit receives an instruction (block 605). Next, the instruction decode unit determines if the instruction satisfies one or more conditions (block 610). Then, the instruction decode unit forwards the instruction to a first microcode unit responsive to determining that the instruction satisfies at least first and second conditions (block 615). In one implementation, the first condition is the instruction being classified as a frequently executed instruction and the second condition is the instruction mapping to a number of ops which is less than a threshold. In other implementations, the first and second conditions are other types of conditions.

Alternatively, the instruction decode unit forwards the instruction to a second microcode unit responsive to determining that the instruction satisfies at least third and fourth conditions (block 620). In one implementation, the third condition is the instruction being classified as an infrequently executed instruction and the fourth condition is the instruction mapping to a number of ops which is greater than or equal to the threshold. In other implementations, the third and fourth conditions are other types of conditions.

In one implementation, the first microcode unit is a smaller, faster structure than the second microcode unit. It is noted that in some implementations, the instruction decode unit is coupled to other numbers of microcode units, and the instruction decode unit forwards the instruction to another microcode unit based on the instruction satisfying one or more other conditions. It is noted that in one implementation, method 600 is performed for each instruction received by the instruction decode unit.

Referring now to FIG. 7, one implementation of a method 700 for implementing a multi-path microcode generation unit is shown. An instruction decode unit receives an instruction of a fetched instruction stream from a fetch unit (block 705). The instruction decode unit determines which type of microcode generation technique to use when generating microcode for the instruction (block 710). If the instruction decode unit determines that a first type of microcode generation technique should be used to generate microcode for the instruction (conditional block 715, "first" leg), then the instruction decode unit sends the instruction on a first path to a simple decode structure (block 720). In one implementation, the first type of microcode generation technique is used for instructions which map to simple microcode sequences. In one implementation, a "simple microcode sequence" is defined as a microcode sequence of one or two ops.

If the instruction decode unit determines that a second type of microcode generation technique should be used to generate microcode for the instruction (conditional block 715, "second" leg), then the instruction decode unit sends the instruction on a second path to a relatively small, fast microcode structure (block 725). In one implementation, the relatively small, fast microcode structure is implemented using a table. In one implementation, the second type of microcode generation technique is used for frequently executed instructions which map to microcode sequences of medium complexity. In one implementation, a "microcode sequence of medium complexity" is defined as a microcode sequence which maps to a given number of ops when the given number is greater than a first threshold but less than a second threshold. The values of the first and second thresholds vary according to the implementation.

Otherwise, if the instruction decode unit determines that a third type of microcode generation technique should be used to generate microcode for the instruction (conditional block 715, "third" leg), then the instruction decode unit sends the instruction on a third path to a relatively large, slow microcode structure (block 730). In one implementation, the relatively large, slow microcode structure is implemented using a ROM. In one implementation, sending the instruction on the third path results in a longer delay than sending the instruction on the second path. After blocks 720, 725, and 730, microcode is retrieved from the corresponding structure on the selected path (block 735). Then, the retrieved microcode is inserted into the decoded instruction sequence (block 740). After block 740, method 700 ends. It is noted that in one implementation, method 700 is performed for each instruction received by the instruction decode unit.

Turning now to FIG. 8, one implementation of a method 800 for determining which microcode sequences to store in a fastpath microcode structure is shown. A computing system identifies frequently executed instructions of a given program (block 805). In one implementation, the identification of the frequently executed instructions is predetermined based on an analysis of the given program. In another implementation, the identification of the frequently executed instructions is performed dynamically in real-time as the program instructions are being executed. Next, microcode sequences of the frequently executed instructions are stored in a fastpath microcode structure (block 810). The other instructions not identified as frequently executed instructions are stored in a microcode structure which is larger than and has a slower access time than the fastpath microcode structure (block 815). After block 815, method 800 ends. It is noted that in one implementation, when the identification of frequently executed instructions is performed dynamically, method 800 is performed on a periodic basis.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
  a first microcode unit configured to retrieve, from a microcode memory of the first microcode unit, a plurality of operations using a plurality of addresses;
  a second microcode unit, wherein the second microcode unit comprises a sequencing unit and a microcode memory, wherein in response to receipt of an address from the sequencing unit:
    one or more operations are retrieved from the microcode memory of the second microcode unit; and
    sequencing information is received by the sequencing unit; and
  an instruction decode unit coupled to the first microcode unit and the second microcode unit, wherein the instruction decode unit is configured to:
    receive an instruction;
    forward the instruction to the first microcode unit responsive to determining the instruction satisfies at least a first condition; and
    forward the instruction to the second microcode unit responsive to determining the instruction satisfies at least a second condition.

2. The processor as recited in claim 1, wherein the first condition comprises the instruction being classified as a frequently executed instruction, and wherein the second condition comprises the instruction being classified as an infrequently executed instruction.

3. The processor as recited in claim 2, wherein the instruction decode unit is further configured to forward the instruction to the first microcode unit responsive to determining the instruction satisfies at least the first condition and a third condition, wherein the third condition comprises the instruction mapping to a number of operations which is less than a threshold.

4. The processor as recited in claim 3, wherein the instruction decode unit is further configured to forward the instruction to the second microcode unit responsive to determining the instruction satisfies at least the second condition and a fourth condition, wherein the fourth condition comprises the instruction mapping to a number of operations which is greater than or equal to the threshold.

5. The processor as recited in claim 1, wherein the processor is further configured to retrieve a plurality of operations corresponding to the instruction from the first microcode unit responsive to the instruction being forwarded to the first microcode unit.

6. The processor as recited in claim 1, wherein the one or more operations are conveyed to a dispatch unit and the sequencing information is used by the sequencing unit to generate addresses for accessing the microcode memory.

7. The processor as recited in claim 1, wherein accessing the first microcode unit has a lower latency than accessing the second microcode unit.

8. A method comprising:
receiving, by an instruction decode unit, an instruction;
forwarding the instruction to a first microcode unit responsive to determining the instruction satisfies at least a first condition, wherein the first microcode unit is configured to retrieve, from a microcode memory of the first microcode unit, a plurality of operations using a plurality of addresses; and
forwarding the instruction to a second microcode unit responsive to determining the instruction satisfies at least a second condition, wherein the second microcode unit comprises a sequencing unit and a microcode memory, wherein in response to receipt of an address from the sequencing unit, the method comprises:
retrieving one or more operations from the microcode memory of the second microcode unit; and
receiving sequencing information by the sequencing unit.

9. The method as recited in claim 8, wherein the first condition comprises the instruction being classified as a frequently executed instruction, and wherein the second condition comprises the instruction being classified as an infrequently executed instruction.

10. The method as recited in claim 9, further comprising forwarding the instruction to the first microcode unit responsive to determining the instruction satisfies at least the first condition and a third condition, wherein the third condition comprises the instruction mapping to a number of operations which is less than a threshold.

11. The method as recited in claim 10, further comprising forwarding the instruction to the second microcode unit responsive to determining the instruction satisfies at least the second condition and a fourth condition, wherein the fourth condition comprises the instruction mapping to a number of operations which is greater than or equal to the threshold.

12. The method as recited in claim 8, further comprising retrieving a plurality of operations corresponding to the instruction from the first microcode unit responsive to the instruction being forwarded to the first microcode unit.

13. The method as recited in claim 8, further comprising conveying the one or more operations to a dispatch unit and using the sequencing information, by the sequencing unit, to generate addresses for accessing the microcode memory.

14. The method as recited in claim 8, wherein accessing the first microcode unit has a lower latency than accessing the second microcode unit.

15. A system comprising:
a memory; and
a processor coupled to the memory;
wherein the processor is configured to:
receive an instruction;
forward the instruction to a first microcode unit responsive to determining the instruction satisfies at least a first condition, wherein the first microcode unit is configured to retrieve, from a memory of the first microcode unit, a plurality of operations using a plurality of addresses; and
forward the instruction to a second microcode unit responsive to determining the instruction satisfies at least a second condition, wherein the second microcode unit comprises a sequencing unit and a microcode memory, wherein in response to receipt of an address from the sequencing unit:
one or more operations are retrieved from the microcode memory of the second microcode unit; and
sequencing information is received by the sequencing unit.

16. The system as recited in claim 15, wherein the first condition comprises the instruction being classified as a frequently executed instruction, and wherein the second condition comprises the instruction being classified as an infrequently executed instruction.

17. The system as recited in claim 16, wherein the processor is further configured to forward the instruction to the first microcode unit responsive to determining the instruction satisfies at least the first condition and a third condition, wherein the third condition comprises the instruction mapping to a number of operations which is less than a threshold.

18. The system as recited in claim 17, wherein the processor is further configured to forward the instruction to the second microcode unit responsive to determining the instruction satisfies at least the second condition and a fourth condition, wherein the fourth condition comprises the instruction mapping to a number of operations which is greater than or equal to the threshold.

19. The system as recited in claim 15, wherein the processor is further configured to retrieve a plurality of operations corresponding to the instruction from the first microcode unit responsive to the instruction being forwarded to the first microcode unit.

20. The system as recited in claim 15, wherein accessing the first microcode unit has a lower latency than accessing the second microcode unit.

* * * * *